May 28, 1957  J. E. McDONALD  2,793,812
AIR CONDITIONING APPARATUS
Filed Dec. 22, 1952  4 Sheets-Sheet 2

INVENTOR.
John E. McDonald
BY Robert J. Palmer
Attorney

May 28, 1957 J. E. McDONALD 2,793,812
AIR CONDITIONING APPARATUS
Filed Dec. 22, 1952 4 Sheets-Sheet 3

INVENTOR.
John E. McDonald
BY Robert J. Palmer
Attorney

May 28, 1957  J. E. McDONALD  2,793,812
AIR CONDITIONING APPARATUS
Filed Dec. 22, 1952  4 Sheets-Sheet 4

INVENTOR.
John E. McDonald
BY Robert J. Palmer
Attorney

United States Patent Office 2,793,812
Patented May 28, 1957

2,793,812
AIR CONDITIONING APPARATUS

John E. McDonald, Newton, Mass., assignor to Westinghouse Electric Corporation, East Pittsburgh, Pa., a corporation of Pennsylvania Application December 22, 1952, Serial No. 327,360

4 Claims. (Cl. 236—13)

This invention relates to air conditioning systems and apparatus, and has as an object to supply warm and cool air from a central conditioner to a plurality of local air distributing units, to mix the warm and cool air in each unit under control of a local thermostat for providing the desired temperature, and to deliver a constant volume of air from each unit.

This invention provides an air conditioning system for, by way of example, an office building, having a local air distributing unit for each room or zone of the building, the units being supplied from a central conditioner through common supply ducts with warm and cool air. The warm and cool air is mixed in each unit under control of an associated local thermostat.

Since due to different exposures of the rooms in which they are located, different thermostat settings, or for other reasons, different units may require different air mixtures, the volume of air to be drawn from one of the two ducts may be greater than that to be drawn from the other of the two ducts. The air pressure in the duct under the lightest load will be sufficient to supply into units supplied with air by this duct, larger volumes of air than are required.

This invention provides a system and air distributing units for the system, in which the air pressure in each supply duct is sufficient to provide a normal, constant volume of air from each unit when all of the units are supplied with warm air alone or with cool air alone. For preventing an air pressure above normal in an air supply duct at a unit from causing a volume of air above normal to be delivered by the unit, each unit is provided with a control responsive to changes in air volume, and with an air throttling means actuated by the control for maintaining constant the volume of air discharged from the unit.

The invention will now be described with reference to the drawings, of which:

Figure 1:
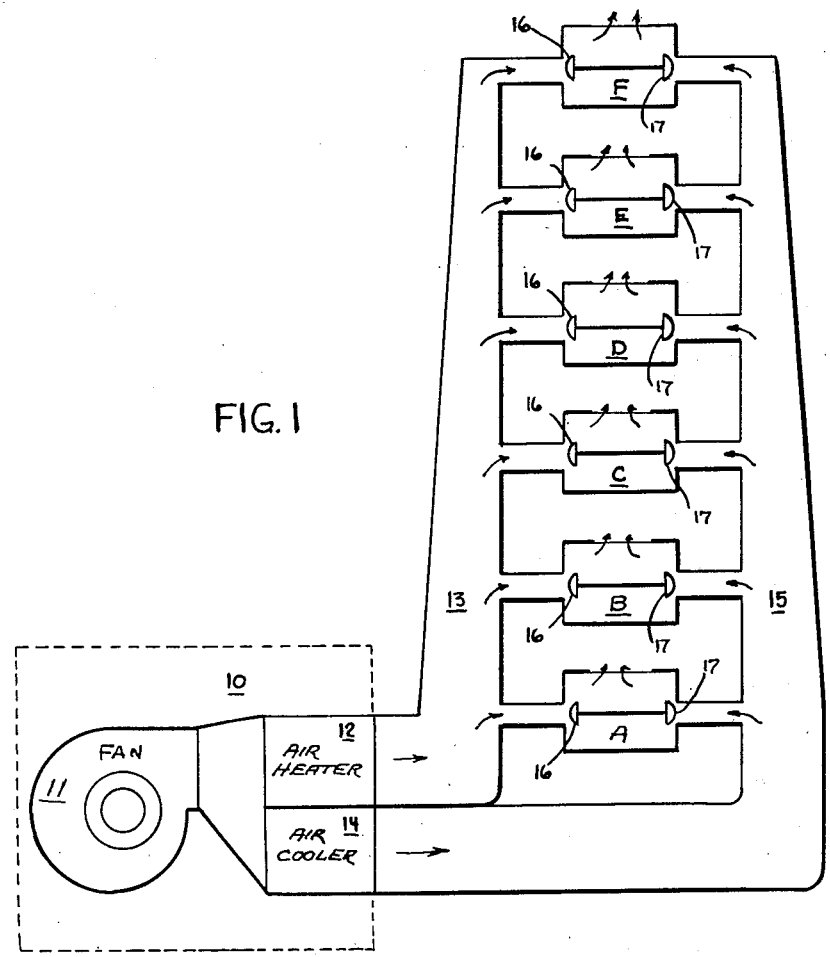
Fig. 1 is a diagrammatic view of an air conditioning system embodying this invention.

Referring first to Fig. 1 of the drawings, a central air conditioner 10 comprises a centrifugal fan 11 which blows air through an air heater 12 into the tapered duct 13 which supplies warm air to the six air distributing units A, B, C, D, E and F. The fan also blows air through the air cooler 14 into the tapered duct 15 which supplies cool air into the six units.

Each of the units has a warm air damper 16, and a cool air damper 17 which normally could be set in their mid-positions at which time, for example, it would be desirable that one hundred cubic feet per minute of warm air and one hundred cubic feet per minute of cool air would be supplied into each unit so that each unit would discharge two hundred cubic feet per minute of air into the space it serves. At this time only 600 cubic feet of air per minute would be required from each of the ducts 13 and 15.

The system is so designed, however, that 1200 cubic feet of air per minute will be supplied into the duct 13 when all of the dampers 17 are closed and all of the dampers 16 are wide open, and so that 1200 C. F. M. of air will be supplied into the duct 15 when all of the dampers 16 are closed and all of the dampers 17 are wide open. Thus when warm air alone or cool air alone is supplied into the units, each unit will discharge the desired 200 C. F. M.

When all of the dampers are in their mid-positions, the pressure loss in ducts 13 and 15 is much less than where 1500 C. F. M. flows in either, and as a result the pressure acting at each mixing unit entrance is higher. As a result each unit will discharge much more than the desired 200 cubic feet of air per minute.

Furthermore, suppose the thermostat of unit F calls for cooling and opens its damper 17 to wide-open position and closes its damper 16, while the thermostats of the other units call for heating, and open their dampers 16 to wide-open position and close their dampers 17. At the time the full pressure, less duct losses, at the inlet to duct 15 will appear at the wide-open damper 17 of the unit F so that unless an additional automatic volume control is provided, very much more than the normal volume of 200 cubic feet of air per minute will be discharged from the unit F. This is an extreme example but in every case where air is drawn from one duct or the other, the one under the lightest load will supply air under too great a pressure into the units it supplies air to, with the result that such units will discharge air volumes greater than normal.

Figs. 2–5 of the drawings illustrate units having automatic air mixing and volume controls which will enable such dual duct units as are shown by Fig. 1 to deliver constant air volumes at all times while maintaining the desired temperatures.

Figure 2:
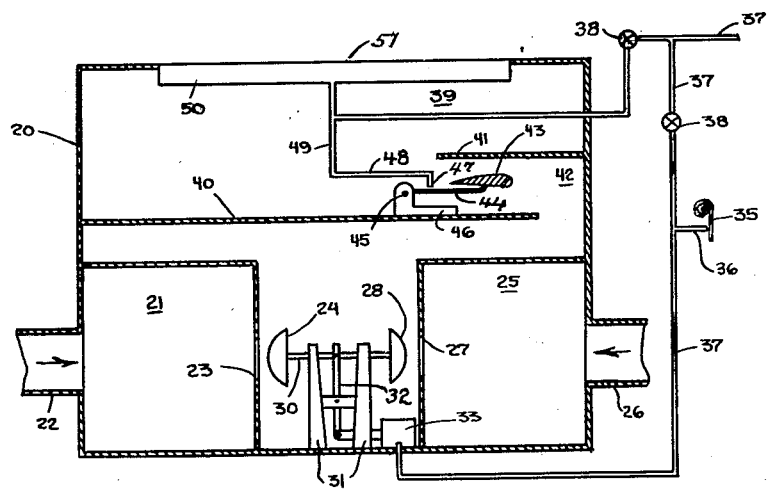
Fig. 2 is a side elevation, with the inner side removed, of an air distributing unit which may be used in the system of Fig. 1.

The unit of Fig. 2 comprises a metal casing having a warm air plenum chamber 21 connected to the branch duct 22, and having an air outlet 23 adjacent the warm air damper 24. The unit has a cold air plenum chamber 25 connected to the branch duct 26, and having an outlet 27 adjacent the cool air damper 28.

The dampers 24 and 28 are interconnected by the rod 30 which is slidably supported in the uprights 31 and moved horizontally by the linkage 32 connected to a piston in the air cylinder 33. The thermostat 35 actuates the dampers by variably closing off or opening the bleed port 36 in the air line 37 connected to a conventional source of compressed air which is not illustrated. The valves 38 in the line 37 are restriction valves for pressure reduction.

Normally the thermostat permits sufficient bleeding of air to cause the piston in the cylinder 33 to maintain the dampers 24 and 28 in mid-position. When the thermostat calls for heat, it expands away from the bleed port, permitting a larger volume of air to bleed, and a reduction in the pressure in the cylinder 33. This causes the damper 24 to move towards wide open position and the damper 28 to move towards closed position, thus admitting more warm air and less cool air into the unit. When the thermostat calls for cooling, it moves towards the bleed port, decreasing the volume of compressed air bled by the latter, causing an increase in the air pressure in the cylinder 33. This results in the warm air damper 24 to be moved towards closed position, and the cool air damper 28 to be moved towards wide open position, thus admitting more cool air and less warm air into the unit.

The horizontally extending partitions 40 and 41 above the plenum chambers provide a constricted air passage 42 into the warm and cool air mixing chamber 39, in which passage is supported a velocity responsive device in the form of an airfoil section 43 attached to one end of the bar 44 which is pivoted at 45 to a support 46 on the partition 40. The bar 44 extends past the bleed port 47 in the compressed air tube 48 connected to a tube 49 which is connected to the inflatable rubber tube 50 at the outlet 51 of the unit.

A normal air volume through the passage 42 will result in such an air velocity that the air foil section will remain at its mid-position with the bar 45 being so spaced from the bleed port 47 that there is sufficient pressure in the tube 49 to inflate the tube 50 to a normal, mid-position in the outlet 51. An increase in air velocity through the passage 42 caused by an increase in air volume above normal, will cause the air foil section 43 to rise and to move the left-hand end of the bar 44 nearer the bleed port 47 so as to decrease the volume of air bled from the port. This will result in an air pressure rise in the tube 49 causing the tube 50 to inflate further and to further obstruct air flowing through the outlet 51 so as to decrease the air volume through the outlet to normal.

If the air velocity through the passage 42 falls below normal, caused by a reduction below normal, of the air volume through the passage, the air foil section 43 will fall and move the bar 44 further from the bleed port 47, resulting in an increase in the volume of air bled from the port, and in the tube 50 deflating sufficiently to permit a normal volume of air to flow through the outlet 51.

Figure 4:
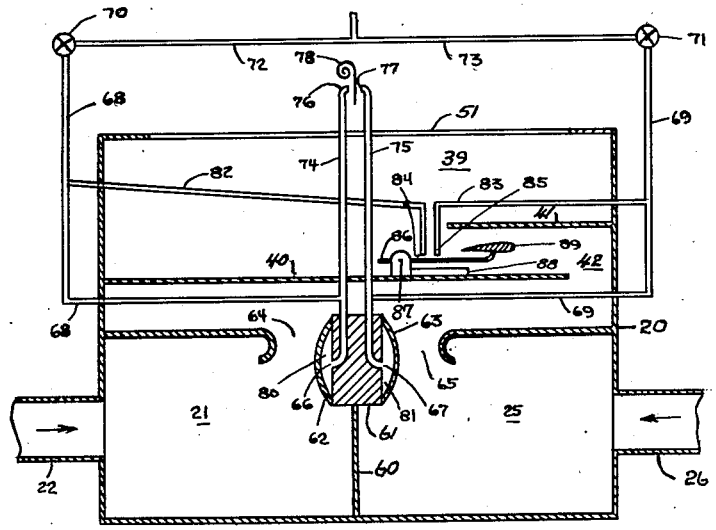
Fig. 4 is a side elevation with the inner side removed, of another air distributing unit which may be used in the system of Fig. 1.

In the air distributing unit of Fig. 4, a dividing wall 60 extends between the plenum chambers 21 and 25. The block 61 is seated on top of the wall 60, and has the inflatable rubber membranes 62 and 63 on the opposite sides thereof and secured at their ends to the top and bottom of the block. The upper walls of the plenum chambers terminate short of the strips 62 and 63 and form outlet openings 64 and 65 from the plenum chambers 21 and 25 respectively. The block has the air passages 66 and 67 connected through the tubes 68 and 69 respectively, the restriction valves 70 and 71 respectively, and the tubes 72 and 73 respectively, to a compressed air source, and through the tubes 74 and 75 respectively, to the bleed ports 76 and 77 on opposite sides of the thermostat strip 78. The openings 66 and 67 connect with the spaces 80 and 81 respectively, between the block 61 and the membranes 62 and 63 respectively. The tubes 68 and 69 are also connected through the tubes 82 and 83 respectively to the bleed ports 84 and 85 respectively, adjacent one end of the strip 86 which is pivoted at 87 to the support 88, and to the opposite end of which is attached the air foil section 89 which is located in a horizontal air passage 42 connecting with the outlets of the plenum chambers 21 and 25 and located between the plenum chamber outlets and the outlet 51 of the unit.

In the operation of the air distributing unit of Fig. 4, normally the thermostat strip 78 will be midway between the bleed ports 76 and 77, and the strip 86 moved by the air foil section 89 will be spaced a normal distance from the bleed ports 84 and 85. At this time the air pressure from the passages 66 and 67 in the block 61 will be sufficient to inflate both membranes the same amount causing them to protrude into the outlets 64 and 65 sufficiently to provide a normal air volume from the unit.

When the thermostat calls for heat it will move towards the bleed port 77 and away from the bleed port 76. This will cause an increase in the pressure of the air against the membrane 63 and a decrease in the air pressure against the membrane 62. The membrane 62 will thus be deflated further and will admit a larger volume of air from the warm air plenum chamber 21, and the membrane 63 will be inflated further and will admit a smaller volume of air for the cool air plenum chamber 25. If the increase in volume of the warm air is not equal to the decrease in volume of cool air, then there will be a velocity change in the passage 42 which will cause, if the air velocity is above normal, the strip 86 to move towards the bleed ports 84 and 85 causing higher pressure in both passages 66 and 67 and, as a result, causing both membranes to inflate and to block off both outlets 64 and 65 sufficiently to provide the normal air volume. If the air volume and velocity are too low as a result of temperature adjustment, the air foil section will be lowered and will cause more air to be bled from the ports 84 and 85, and causing both membranes 62 and 63 to be further deflated.

When the thermostat calls for cooling, its strip will move towards the bleed port 76 and away from the bleed port 77, causing the membrane 62 to inflate further, and the membrane 63 to deflate further, causing a larger volume of cool air and a smaller volume of warm air to move through the unit. The volume control comprising the air foil section and the bleed ports 84 and 85 will operate in the previously described manner to maintain a constant volume through the unit.

Figure 5:
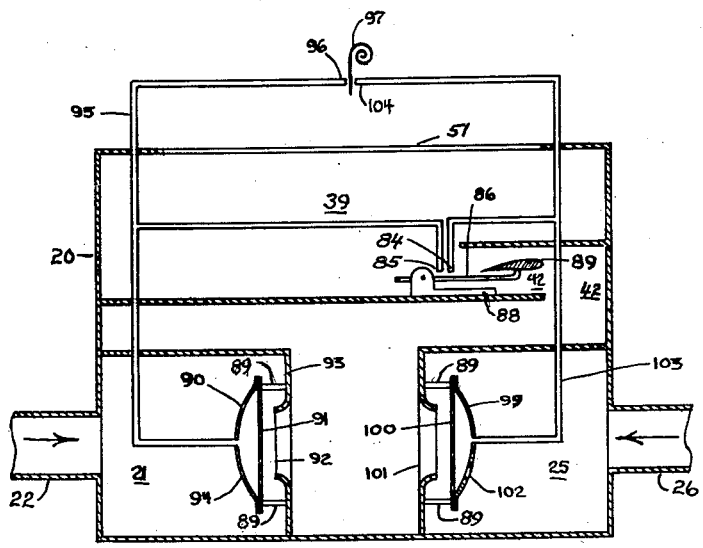
Fig. 5 is a side elevation, with the inner wall removed, of another air distributing unit which may be used in the system of Fig. 1.

In the air distributing unit of Fig. 5, the air pressure in the conditioned air is used for control purposes instead of an external source of compressed air. The warm air plenum chamber 21 contains a pan-shaped plate 90 having a circular open side to which is attached a circular flexible membrane 91 which is spaced from the outlet 92 of the plenum chamber 21. The plate 90 is supported by the spacers 89 from the inner wall 93 of the plenum chamber which contains the outlet 92.

The plate 90 has a relatively small opening 94 which admits air from the plenum chamber 21 into the space between the outer or back side of the membrane 91 and the plate. An outlet opening from this space is connected through the tube 95 to the bleed port 96 on one side of the thermostat strip 97. The inner or front side of the membrane 91 is exposed to the full air pressure in the plenum chamber. Air normally bleeds through the bleed port 96 with the membrane 91 in its normal uninflated position.

The plenum chamber 25 has a similar pan-shaped plate 99 with a similar circular membrane 100 secured at its edge to the circular, open inner or front side of the plate alongside the outlet 101.

The plate 99 has a relatively small opening 102 which admits air from the plenum chamber 25 into the space between the outer or back side of the membrane 100 and the plate 99. An outlet opening from this space is connected through the tube 103 to the bleed port 104 on the other side of the thermostat strip 97.

Normally, with the thermostat strip 97 in its mid-position the membranes 91 and 100 would both be the same distance from the outlets 92 and 101 respectively, at which time one hundred cubic feet of air per minute would be supplied through each outlet.

A rise in temperature would cause the thermostat strip to move away from the bleed port 104 and towards the bleed port 96. This would result in less air being bled from the port 104. This would result in an increase in pressure behind the membrane 91 causing it to move towards its outlet port 92 and to reduce the air volume through the port 92, and in a decrease in pressure behind the membrane 100 causing it to move away from the outlet port 101 and permit a greater volume of air to pass therethrough.

Upon a fall in temperature an opposite action would take place.

Upon a rise in the velocity of the air through the passage 42, the strip 86 will be lifted by the air foil section and moved towards the bleed ports 84 and 85 causing higher pressures in the spaces behind the diaphragms 91 and 100 causing them to bulge towards the outlets 92 and 101 respectively, and causing a reduction in the volume of air passing through both outlets.

Figure 6:
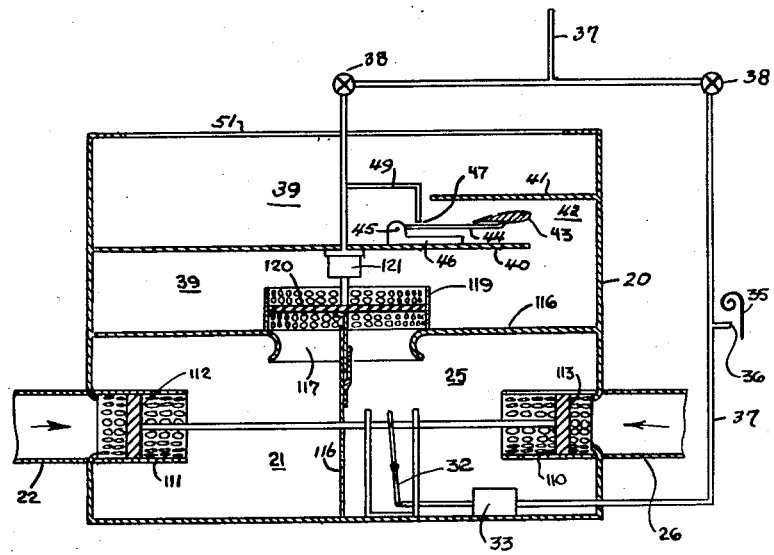
Fig. 6 is a side elevation, with the inner side removed, of another air distributing unit which may be used in the system of Fig. 1.

The unit of Fig. 6 has the perforated sleeves 110 and 111 lined-up with the inlets 22 and 26 respectively, with the piston dampers 112 and 113 respectively, slidable in the sleeves by the linkage 32 connected to the piston of the air cylinder 33.

The dividing wall 116 between the warm and cool air mixing chamber 39 and the warm and cool air plenum chambers has a circular outlet port 117 thereon across which the vertical partition 116 diametrically extends and forms a common wall between the two plenum chambers.

The perforated sleeve 119 extends upwardly around the port 117 and has the piston damper 120 slidable therein by the piston of the air cylinder 121.

The local thermostat 35 controls as in Fig. 2, the supply of air to the cylinder 33 for causing less warm air and more cool air to be admitted upon a rise in temperature, and the reverse action upon a fall in temperature.

An increase in air volume above normal will result in the air foil section 43 lifting and in the bleed port 47 being closed off so that the increase in air pressure within the cylinder 121 will cause it to adjust the damper piston 120 nearer the port 117 for decreasing the total volume of air.

The perforated sleeves 110, 111 and 119 through which the air is caused to pass, provides more uniform air distribution, reduced air noise, and the resistance required for the characteristics of the system.

Figure 3:
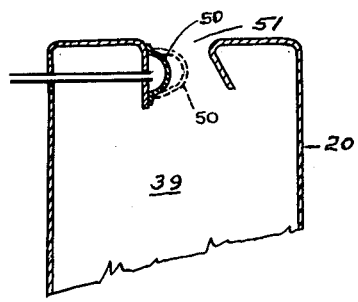
Fig. 3 is an end elevation, in section, of the upper or outlet end of the unit of Fig. 2.

A good definition of "to inflate" is "to blow." Accordingly the partial tube 50 of Figs. 2 and 3 is said to be inflated under air pressure, as are the membranes 62 and 63 of Fig. 4 and the membranes 91 and 100 of Fig. 5. While it is preferred that the membranes be of rubber-like resilient material, they need not necessarily be so since flexible sheets such as cloth could be blown forward towards their associated air outlets or collapsed in absence of air pressure to blow them forward.

While embodiments of the invention have been described for purposes of illustration, it should be understood that the invention is not limited to the exact apparatus and arrangement of apparatus illustrated as modifications thereof may be suggested by those skilled in the art without departure from the essence of the invention.

What is claimed is:

1. An air distributing unit comprising a casing having an air outlet, a warm air inlet, a cool air inlet, and a warm air and cool air mixing chamber; a control responsive to changes in the volume of the air flowing through said chamber; a warm air plenum chamber in said casing connected to said warm air inlet and having a warm air outlet; a cool air plenum chamber in said casing connected to said cool air inlet and having a cool air outlet; said mixing chamber being located between said warm and cool air outlets and said first mentioned outlet; a first inflatable damper in said warm air plenum chamber adjacent said warm air outlet; a second inflatable damper in said cool air plenum chamber adjacent said cool air outlet; a local thermostat; means controlled by said thermostat for inflating said warm air damper upon a rise in temperature and for inflating said cool air damper upon a fall in temperature, and means controlled by said volume responsive control for inflating both of said dampers upon an increase in the volume of the air through said passage.

2. An air distributing unit as claimed in claim 1 in which a constricted passage is formed in said mixing chamber through which the air flows at a higher velocity than through the remainder of the mixing chamber, and in which the volume responsive control is a velocity responsive control arranged in said passage.

3. An air distributing unit comprising a casing having an air outlet; a warm air inlet and a cool air inlet; a warm air plenum chamber in said casing connected to said warm air inlet; a cool air plenum chamber in said casing connected to said cool air inlet; a warm and cool air mixing chamber between said plenum chambers and said outlet; said plenum chambers having outlets discharging into said mixing chamber; a warm air damper movable towards and away from said warm air plenum chamber outlet; a cool air damper movable towards and away from said cool air plenum chambers outlet; a local thermostat; means controlled by said thermostat for causing said warm air damper to move towards said warm air plenum chamber outlet upon an increase in temperature and for causing said cool air damper to move towards said cool air plenum chamber outlet upon a fall in temperature; a control responsive to changes in the air volume passing through said air mixing chamber, and means actuated by said control for causing both of said dampers to move towards said plenum chamber outlets upon an increase in the volume of air passing through said plenum chamber.

4. An air distributing unit as claimed in claim 3 in which the volume control comprises an air velocity responsive control located in a constricted air passage in said mixing chamber.

References Cited in the file of this patent

UNITED STATES PATENTS

| Number | Name | Date |
|---|---|---|
| 699,352 | Titus | May 6, 1902 |
| 1,931,356 | Porter | Oct. 17, 1933 |
| 1,949,030 | Stockmeyer | Feb. 27, 1934 |
| 2,231,826 | Foss | Feb. 11, 1941 |
| 2,321,573 | Chace | June 15, 1943 |
| 2,412,071 | Warner et al. | Dec. 3, 1946 |
| 2,440,052 | Lingen et al. | Apr. 20, 1948 |
| 2,517,056 | Trubert | Aug. 1, 1950 |
| 2,542,273 | Brown | Feb. 20, 1951 |
| 2,609,183 | Fitzgerald | Sept. 2, 1952 |
| 2,620,983 | Lyman | Dec. 9, 1952 |
| 2,660,946 | Peple | Dec. 1, 1953 |